INVENTOR.
JAMES J. ECKL
BY
William H. Schmeling

INVENTOR.
JAMES J. ECKL
BY
William H. Schmeling

United States Patent Office 3,450,903

Patented June 17, 1969

3,450,903

TRANSISTOR SWITCHING CIRCUIT

James J. Eckl, Milwaukee, Wis., assignor to Square D Company, Park Ridge, Ill., a corporation of Michigan Filed Mar. 25, 1966, Ser. No. 537,563
Int. Cl. H03k 5/13, 19/34
U.S. Cl. 307—261 5 Claims

ABSTRACT OF THE DISCLOSURE

A circuit for synchronizing the switching of the logic circuits in a resistance welder control circuit with the reversal in current flow of an alternating current supply after a closure of an initiating switch. The circuit includes a transistor and a diode each having substantially equal minimal impedances when conducting in their forward directions. The transistor and the diode are connected across the output terminals of a transformer secondary winding so that the transistor will supply an input signal to a Nor circuit which also receives an input signal through the initiating switch so the Nor circuit will provide an output signal change only at the beginning of a predetermined polarity change of the current wave of the alternating current supply after the initiating switch is operated.

Figure 1:
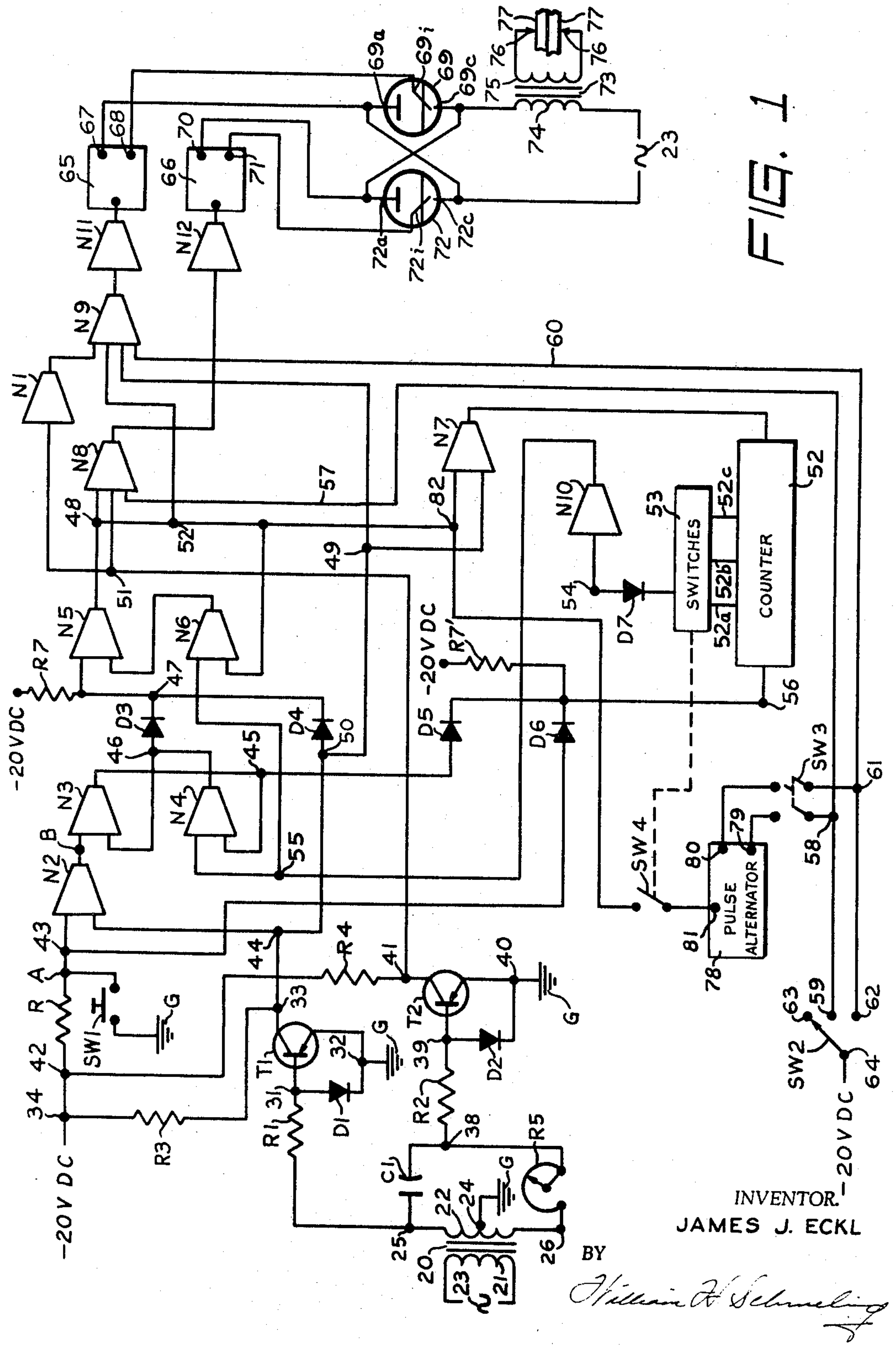

This invention relates to control circuits and more particularly to a circuit which will control the flow of energy from an alternating current source to a load, such as the electrodes of a resistance welder and is a division of an application for Patent No. 3,277,317 granted on Oct. 4, 1966.

Resistance welder controls usually are provided with a timing section which includes devices for determining the time interval for performing one or more operations of the welder apparatus and a contactor section which, in response to the control exercised by the timing section, controls the flow of energy between an alternating current source and the primary winding of a welding transformer which has its secondary winding connected in series with a pair of welding electrodes.

The present invention is concerned with an inexpensive control which is particularly suited for use in the timing section of a resistance welder to control both the time during which the welding current flows and to adjustably control the total energy which flows between the welding electrodes during the weld time. The timing section of the control according to the present invention is characterized by the fact that it includes a plurality of Nor circuits which receive triggering signals from a low voltage transistorized heat control circuit and a circuit which synchronizes the triggering of the Nor circuits with the voltage wave of the alternating current source in a manner that random initiation of the weld time will not result in random initiation of welding current flow. The time interval of welding current flow is controlled by a counter which, along with other Nor circuits in the control circuit, is supplied with a signal from a novel reset circuit so that upon initial energization of the circuits a predetermined status of the counter and Nor circuits is established.

It is an object of the present invention to provide an inexpensive control circuit for a resistance welder which includes a novel synchronizing circuit, a novel heat control circuit, and a novel off return circuit for the Nor circuit logic components and counter as used in the control circuit.

It is another object of the present invention to provide an inexpensive control circuit for a resistance welder which includes a novel synchronizing circuit, heat control circuit, and off return circuit which control circuit may be adjusted to form a series of successive welds with each weld formed by current from an alternating current source having a half cycle duration without saturating the welding transformer with magnetic flux formed by a direct current component of the alternating current.

It is another object of the present invention to provide an inexpensive circuit for synchronizing the switching of a plurality of Nor circuits in a weld timer wherein the synchronizing circuit includes a transformer secondary winding which is energized by the alternating current supply for the resistance welder, a diode and a transistor which are connected to conduct current in opposite directions so that the transistor will provide a series of output signals which are in phase with the voltage wave of the supply as the transistor switches between a conducting and non-conducting state in response to the direction of current flow through the diode and transistor.

A further object of the present invention is to provide an inexpensive heat control circuit for switching a plurality of Nor units in a resistance welder control, which heat control circuit includes: a center tapped transformer secondary winding which has its end terminals respectively connected through a capacitor and an adjustable resistor to a common junction, a transistor and a unidirectional conducting diode, which diode and transistor are connected in series with a resistor to provide paths for current flow in opposite directions between the center tap and the common junction which current flow is displaced in phase by an amount determined by the setting of the adjustable resistor from the alternating current which energizes the secondary winding.

A still further object is to provide an inexpensive off return circuit in a logic circuit which includes a memory composed of a pair of Nor circuits, which off return circuit includes a Nor circuit that has its output terminal connected to the reset of the memory and its input terminal connected in a circuit which includes a unidirectional conducting diode to a terminal of a direct current source for the logic circuit. The diode being selected and connected in the circuit to provide a low impedance path to the current flow between the input terminal and source terminal after the voltage of the direct current source reaches a predetermined value.

It is still another object of the present invention to provide a timer for a resistance welder control which may be selectively adjusted so the welding current flow which forms the individual welds will have a duration of one half cycle or less of the voltage wave of an alternating current supply and to achieve the foregoing by alternately firing the individual thyratrons or ignitrons of a pair of thyratrons or ignitrons during formation of successive welds so that saturation of the welder transformer by rectified direct current from the alternating current supply is eliminated.

Further objects and features of the invention will be readily apparent to those skilled in the art from the specification and appended drawing illustrating certain preferred embodiments, in which:

FIG. 1 schematically shows the arrangement of the components as used in circuits according to the present invention.

Figures 2, 3:
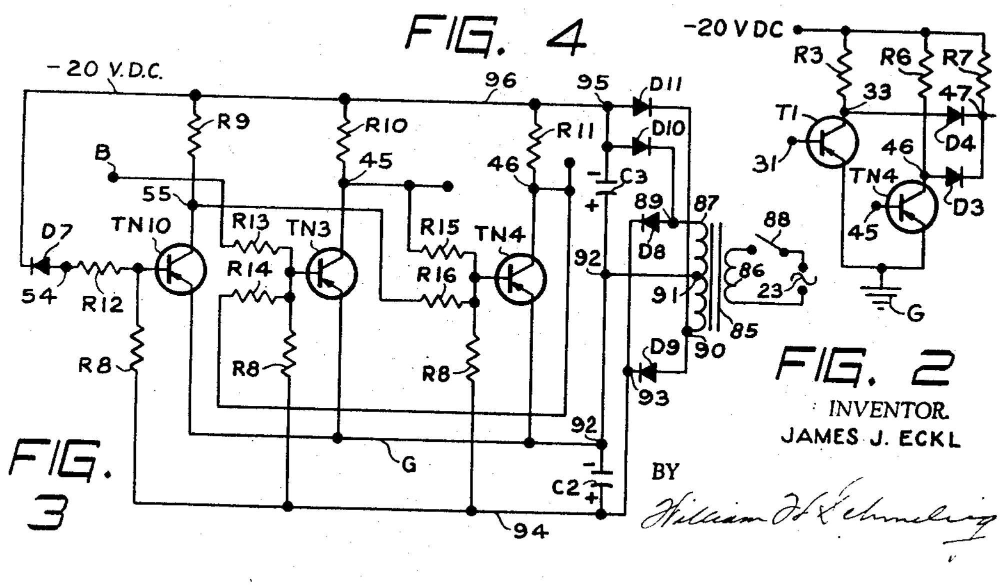

FIG. 2 specifically shows in detail a circuit which provides an And function as used in the circuit in FIG. 1.

FIG. 3 specifically shows in detail a reset circuit as used in the circuit in FIG. 1.

Figure 4:
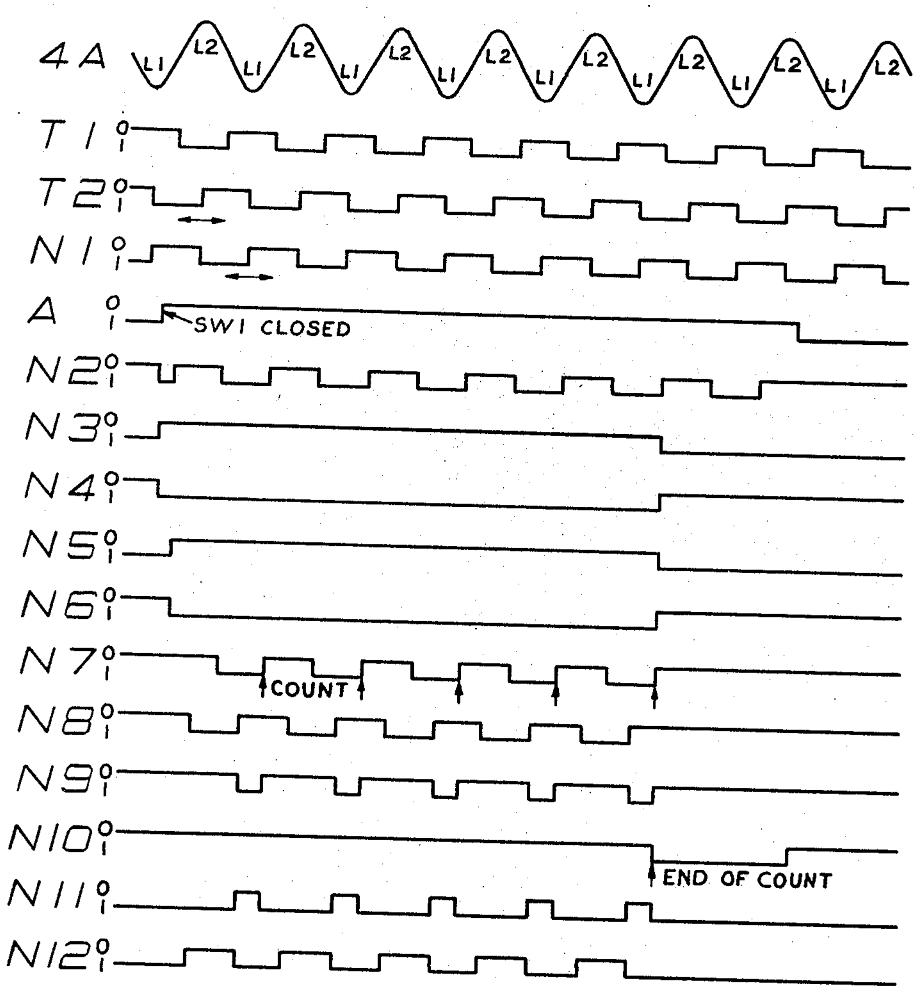

FIG. 4 illustrates the curves and signals with time as a reference as provided by the components in the circuit shown in FIG. 1.

As shown in FIG. 1 of the drawings, a transformer 20 has a primary winding 21 and a secondary winding 22 with the primary winding 21 energized by a source of alternating current 23. The secondary winding 22 has a center tap 24 located between a pair of output terminals 25 and 26. The center tap 24 is directly connected to ground, hereinafter indicated by the numeral G. The output terminal 25 is connected through a resistor R1 to a junction 31. The junction 31 is connected through a diode D1 and a junction 32 to the ground G. The junction 31 is also connected to a base electrode of a transistor T1. Unless specifically mentioned, all of the transistors used in the circuits shown in the drawings are of the PNP type and therefore further reference thereto will not be made. The transistor T1 has a collector electrode connected through a junction 33 and a resistor R3 to a negative terminal of a DC supply of −20 v. DC at a junction 34 and an emitter electrode connected through the junction 32 to the ground G. The diode D1 is connected in the circuit between junction 31 and ground G in a direction to conduct current when the junction 31 has a positive polarity relative to the ground G and the emitter to base of the transistor T1 is connected to provide a path for current when the ground G has a positive polarity relative to the junction 31.

The output terminal 26 is connected through an adjustable resistor R5 to a common junction 38. Similarly, the terminal 25 is connected through a capacitor C1 to the common junction 38. It will be seen that the foregoing arrangement will provide an adjustable RC phase shift circuit including the resistor R5 and the capacitor C1 which will cause the phase of the voltage between the common junction 38 and the ground G to be displaced in time from the voltage across the secondary winding 22 which, in turn, is fixed in phase relation with the voltage of the source 23. The junction 38 is connected through a resistor R2 to a junction 39 which in turn is connected to a base electrode of a transistor T2. The junction 39 is also connected through a diode D2 and a junction 40 to ground G. The transistor T2 has a collector electrode connected through a junction 41 and a resistor R4 to a junction 42 which is connected to the negative terminal of the 20 volt DC supply. The transistor T2 has an emitter directly connected through the junction 40 to the ground G. The diode D2 is connected between the junction 39 and the ground G in a direction to provide a path for current when the common junction 39 has a positive polarity relative to the ground G. Similarly, the emitter and the base of transistor T2 are connected to provide a path for current when the ground G is positive relative to the junction 39.

The negative terminal of the 20 volt DC supply is connected through a resistor R to a junction designated as A. The junction A is connectible through an initiating switch SW1, having normally open switch contacts, to the ground G. The junction A is also connected through a junction 43 to an input of a Nor circuit N2.

As the basic Nor circuits used in the circuits which will be hereinafter described are well known, hereinafter the Nor circuit units will be designated as a Nor followed by an identifying suffix.

The Nor N2 has a second input connected through a junction 44 to the collector circuit of transistor T1 at the junction 33. The Nor N2 has an output connected through a junction B to an input of a Nor N3 which is connected with a Nor N4 so that the Nors N3 and N4 act as a Nor memory. The Nor N3 has an output connected to a junction 45, which is connected to provide an input to the Nor N4 and an input to a diode D5. The Nor N4 is connected through a junction 46 to supply an input to the Nor N3 and an input to a diode D3. The output of the diode D3 is connected through a junction 47 to supply an input to a Nor N5 which is connected with a Nor N6 so that the Nors N5 and N6 act as a Nor memory. The junction 47, which supplies an input to the Nor N5, is connected through a resistor R7 to the negative terminal of the DC supply of −20 v. DC and is arranged to receive an input through a diode D4 from the collector circuit of transistor T1 at the junction 33. The output of the Nor N5 is connected through a junction 48 to supply an input to the Nor N6 and a Nor N7 as well as a Nor N8 and a Nor N9. The Nor N6 has an output connected to a second input of the Nor N5. The Nor N7 has a second input connected through a junction 49 and a junction 50 to the junction 44 which is connected in the collector circuit of the transistor T1 at the junction 33. The Nor N8 has a second input connected through a junction 51 to the collector circuit of the transistor T2 at the junction 41. The output of the Nor N8 is directly connected to an input of a Nor N12. The Nor N9, which has an output connected to supply an input to a Nor N11, has a second input connected through a Nor N1, and a junction 51 to the junction 41 in the collector circuit of the transistor T2. The Nor N9 additionally has a third input connected through the junctions 49 and 50 and the junction 44 to the junction 33 in the collector circuit of the transistor T1. The Nor N7 has an output connected to supply an input to a counter 52 which has a plurality of outputs connected as inputs to a plurality of switches indicated by a numeral 53. The switches 53 are connected through a diode D7 to supply an input through a junction 54 to a Nor N10. The Nor has an output connected through a junction 55 to a second input of the Nors N4 and N6. The counter 52 has a reset terminal 56 which is connected through a diode D6 to the junction 43 and through the diode D5 to the output of the Nor N3 at the junction 45. The Nor N8 has a third input connected through a lead 57 and a junction 58 to a terminal 59 of a selector switch SW2. Similarly, the Nor N9 has a fourth input connected through a lead 60 and a junction 61 to a terminal 62 of the selector switch SW2. The selector switch has an additional terminal 63. The switch SW2 has a common terminal 64 connected to the negative 20 volt direct current supply arranged so that a circuit can be completed to any one of the terminals 59, 62 or 63. A pulse alternator 78 has a pair of output terminals 79 and 80 respectively connectible through the contacts of a normally open switch SW3 to the junctions 58 and 61 and an input terminal 81 connected through the contacts of a normally open switch SW4 to the output of the Nor N5 at a junction 82.

The output of the Nor N11 is connected to an input of a suitable firing circuit indicated by the numeral 65. Similarly, the output of the Nor 12 is connected to an input of a suitable firing circuit 66. The firing circuit 65 is provided with a pair of output terminals 67 and 68. The output terminal 67 is connected to an anode electrode 69A of an ignitron 69 and a cathode 72*c* of an ignitron 72. The output terminal 68 is connected to an igniter electrode 69*i* of the ignitron 69. Similarly, the firing circuit 66 has a pair of output terminals 70 and 71 with the output terminal 70 directly connected to an anode 72*a* of the ignitron 72 and a cathode 69*c* of the ignitron 69. The output terminal 71 is connected to an igniter electrode 72*i* of the ignitron 72. The ignitrons 69 and 72 are connected in a typical inverse parallel arrangement with their cathodes 69*c* and 72*c* connected to the alternating current source 23 which also supplies the transformer 20. A welding transformer 73 has a primary winding 74 connected in the anode to cathode circuits of ignitrons 69 and 72 are a secondary winding 75 connected to supply a pair of welding electrodes 76 which are arranged to be moved into engagement with the parts 77 which are to be welded together.

In FIGS. 2 and 3 of the drawings, certain of the components as used within the Nor circuits are illustrated to facilitate an explanation of the And circuits. The transistors, which are designated as TN3, TN4 and TN10, correspond to the transistors within the Nors N3, N4 and N10 in FIG. 1. Similarly, the diodes D3, D4 and D7 along with the transistor T1, the ground G and the junctions B, 31, 33, 45, 46, 47, 54 and 55, and the resistors R3 and R7 represent similar items in FIG. 1.

The transistors T1 and TN4, shown in FIG. 2, have their emitter electrodes directly connected to the ground G. The collector electrode of transistor T1 is connected through the junction 33 and the resistor R3 to the negative terminal of the 20 volt DC supply. The base electrode of the transistor T1 is connected to the junction 31. The transistor TN4 has a collector electrode connected through the junction 46 and a resistor R6 to the negative terminal of the 20 volt DC supply and a base electrode connected to the junction 45. The diode D4 is connected to provide a low impedance path for current flow between the junctions 33 and 47. Similarly, the diode D3 is connected to provide a low impedance path to current flow between the junction 46 and the junction 47. The junction 47 is also connected through the resistor R7 to the negative terminal of the 20 volt DC source.

In FIG. 3, complete Nor circuits are illustrated in connection with transistors TN3 and TN4 which are interconnected to provide a Nor memory function. In FIGS. 1 and 2, the direct current source which supplies the negative 20 volts DC current is not shown. This source is illustrated in FIG. 3 as a circuit which includes a transformer 85. The transformer 85 has a primary winding 86 and a secondary winding 87. The primary winding 86 is connectible to the alternating source 23 by a switch 88 and the secondary winding 87 has a pair of output terminals 89 and 90 and a center tap 91 which is connected at a junction 92 to ground G. The terminals 89 and 90 are respectively connected through a pair of diodes D8 and D9 and a junction 93 to a lead 94. A capacitor C2 is connected between junction 93 and ground G. Similarly, the terminals 89 and 90 are respectively connected through a pair of diodes D10 and D11 and a junction 95 to a lead 96, with a capacitor C3 connected between the junction 95 and the ground G. The diodes D8 and D9 are connected between the terminals 89 and 90 and junction 93 so the capacitor C2 is charged with a polarity making the lead 94 positive relative to the ground G. The diodes D10 and D11 are connected between terminals 89 and 90 so the capacitor C3 is charged with a polarity making the ground G positive in polarity relative to the lead 96. The transformer 85 is selected so leads 94 and 96 will be respectively 20 volts positive and 20 volts negative relative to the ground G.

The lead 94, which is connected through suitable bias resistors R8 to the base electrodes of the transistors TN10, TN3 and TN4, provides a positive bias between the base and emitters of the respective transistors which normally biases the transistors against conduction. A comparable direct current bias supply, which is not shown, is connected to each of the Nors in FIG. 1 and the transistors in FIG. 2. As shown in FIG. 3, the transistor TN10 has a collector electrode connected through the junction 55 and a resistor R9 to the lead 96. Similarly, the transistor TN3 has a collector electrode connected through the junction 45 and a resistor R10 to the lead 96 and the transistor TN4 has a collector electrode connected through the junction 46 and a resistor R11 to the lead 96. The transistors TN10, TN3 and TN4 each have an emitter electrode directly connected to the ground G.

The transistor TN10 has a resistor R12 connected between the junction 54 and the base electrode. The transistors TN3 and TN4 have similar resistors connected to their base electrodes, which are designated as R13, R14, R15 and R16. Comparable resistors as R12–R16 are used in each of the inputs of the Nors in FIG. 1 and the transistors in FIG. 2. The base of the transistor TN10 is shown as solidly connected through the resistor R12, the junction 54 and the diode D7 directly to the lead 96. In actual logic circuits the solid connection between the diode D7 and lead 96 may be controlled by other logic units, such as a Nor, or switches, such as the presetting switches 53 in FIG. 1. The terminal B is connected through the resistor R13 to the base electrode of transistor TN3 and the junction 55 is connected through the resistor R16 to the base electrode of transistor TN4 to provide input signals to the transistors TN3 and TN4, respectively. The connection between the junction 45 and the base electrode of the transistor TN4 through the resistor R15 and the junction 46 and the base electrode of the transistor TN3 through the resistor R14 causes the transistors TN3 and TN4 to act as a Nor memory.

With the foregoing description of the circuits shown in FIGS. 1–3 in mind, the operation of FIGS. 2 and 3 will now be explained. The circuit shown in FIG. 2 performs a Nor and an And function. It is apparent that when either of the transistors T1 or TN4 is conducting, current will flow from the ground G through the conducting transistor; for example, if transistor T1 is conducting, current will flow to the junction 33 where it divides into a parallel circuit, one branch of which includes the resistor R3 and the other branch includes the diode D4, the junction 47 and the resistor R7. Similarly, when the transistor TN4 is conducting, current will flow from the ground G through the transistor TN4 and the junction 46 into the parallel path consisting of the resistor R6 in one branch of the parallel circuit and the diode D3, the junction 47 and the resistor R7 in the other branch of the parallel circuits. Thus when either or both of the transistors T1 and TN4 are conducting, the junction 47 will be at a potential practically equal to the ground potential as the impedance of the transistors and the diodes are selected to be negligible when conducting in the forward direction. When both of the transistors T1 and TN4 are made nonconducting by the absence of a signal at their base electrodes, then the junctions 33 and 46 will have a potential impressed thereon substantially equal to the negative potential of the 20 volts DC source and the junction 47 likewise will have a similar negative voltage impressed thereon.

The diodes D3 and D4 isolate the circuits including the transistors T1 and TN4 from each other and effectively block current flow from the junction 47 to the junctions 33 and 46. If the diodes D3 and D4 were omitted, then when one transistor, e.g., transistor TN4 was conducting, and the other transistor, e.g., T1 was nonconducting, all of the junctions 33, 46 and 47 would be at ground potential even though the nonconductive state of transistor T1 in the logic system would require the junction 33 to be at the potential of the negative supply. Thus if the signal at junction 33 was required to supply other transistors in Nors, a false signal would be provided in the logic system. Thus the circuit shown in FIG. 2 provides a Nor and an And function wherein the conduction of either of the transistors T1 or TN4 will cause the potential at the junction 47 to be equal to the ground G potential and the nonconduction of both of the transistors T1 and TN4 is required to have the junction 47 at the negative potential of the supply. It will be seen that the circuit which includes the diodes D5 and D6 and terminal 56 of the counter which is connected through a resistor R7′ to the negative terminal of a 20 v. DC supply is identical to the circuit configuration which includes diodes D3, D4 and the resistor R7 so that the diodes D5 and D6 will provide an And function as described in connection with diodes D3 and D4.

Before describing the operation of the circuit in FIG. 1, a brief description of a Nor circuit is believed appropriate. A typical Nor circuit is fully shown and described in U.S. Patent No. 3,243,652, issued Mar. 29, 1966 to Charles F. Meyer and James J. Eckl, or as shown in FIG. 7–4 of sections 7–22 of a handbook of Selected Semiconductor Circuits published under contract No. BSR 73231 for the Bureau of Ship Department of the Navy.

A typical Nor circuit as shown in connection with FIG. 3 includes a transistor, e.g., transistor TN3, which has a plurality of inputs connected through resistors to its base. The base is biased positive relative to the emitter of the transistor by a suitable direct current source so that in the case of a pnp transistor, the transistor is biased against conduction. The collector of the transistor is connected through a junction, e.g., junction 45, and a resistor, e.g., R10, to a negative terminal of a source which has its positive terminal connected to the emitter. When a negative voltage is applied to either the junction B or the junction 46 to bias the base of the transistor TN3 negative to its emitter, the transistor TN3 becomes conductive, and the negative voltage previously present at the junction 45 disappears.

Thus if a negative signal is impressed on any of the inputs of a Nor, no output signal will appear at the junction associated with the collector circuit of the transistor within the Nor, and if all of the negative inputs to the Nor are removed, the output signal will appear as a negative voltage. For the purpose of description, hereinafter the negative voltage signal will be considered as a "1" signal and the absence of the negative signal will be designated as a "0" signal. Thus in view of the foregoing, if a "1" signal is impressed on any of the inputs of a Nor, then the Nor will provide a "0" output signal, and when all of the inputs of a Nor have a "0" signal, the Nor will furnish a "1" output signal.

With the foregoing in mind, the operation of the circuit shown in FIG. 1 will be described, reference being had to the curves shown in FIG. 4. In FIG. 1, the alternating current source 23 energizes the primary windings 21 and 74 of the transformers 20 and 73. The voltage wave of the source 23, as is illustrated as curve 4A in FIG. 4, is also induced in the secondary windings 22 and 75 and appears across the terminals 25 and 26 wherein the half cycle designated as L1 indicates that the terminal 26 and the ground G is positive relative to the terminal 25 and the half cycle designated as L2 indicates the terminal 25 positive in polarity relative to the terminal 26 and the ground G.

Thus during an L2 half cycle when the terminal 25 is positive, current will flow from the terminal 25 through the resistor R1, the junction 31, the diode D1, the junction 32 and through the ground G to the center tap 24. This direction of current flow will bias the transistor T1 against conduction and cause a negative voltage to be impressed on the junction 33 which is shown as a "1" during the L2 half cycle on the T1 curve in FIG. 4. Similarly, during the L1 half cycle when the ground G is positive, current flows from the ground G through the junction 32, the emitter to base electrodes of transistor T1, the junction 31, the resistor R1 to the terminal 25. This direction of current flow biases the transistor T1 into conduction and causes the negative voltage at the junction 33 to be removed which is indicated as a "0" signal during the L1 half cycle on curve T1 in FIG. 4.

The terminal 26 is connected through the resistor R5 to the junction 38 and the terminal 25 is connected through the capacitor C1 to the junction 38. The resistor R5, which is adjustable, and the capacitor C1 provide an adjustable phase shift circuit which causes the phase of the voltage wave between the junction 38 and the ground G to lead the voltage wave of the source 23 by an adjustable amount depending on the setting of the resistor R5. Thus during the L2 half cycle when the ground G is positive relative to the junction 38, although leading in phase relative to the voltage wave of the source 23, which is indicated by curve 4A, current will flow from the ground G through a circuit which includes the junction 40, the emitter to base of transistor T2, the junction 39, the resistor R2 and the junction 38. However, as the wave of the voltage between the ground G and the junction 38 leads the voltage wave of the source 23, the change in polarity to a positive potential at the junction 38 will occur before the L2 half cycle of the source 23. When the junction 38 goes positive in polarity, current flows through a circuit including the resistor R2, the junction 39, the diode D2 and the junction 40 to the ground G. The current flow in the direction from the junction 39 to the junction 40 biases the transistor against conduction so a negative voltage signal appears at the junction 41. This will cause a signal change from "0" to "1" as shown on curve T2 in FIG. 4.

The resistors R1 and R2 in their respective circuits are selected to have a high impedance value and the diodes D1 and D2 and the transistors T1 and T2 have a very low impedance value when conducting in the forward direction. Because the impedance of the resistors R1 and R2 will be equal regardless of the direction of current flow, the conduction of the network including the diode D1 and the transistor T1 will closely follow the voltage wave between the terminal 25 and the ground G and the conduction of the network including the diode D2 and the transistor T2 will closely follow the voltage wave between the common junction 38 and the ground G.

As previously stated, when the transistors T1 and T2 are nonconducting, the junctions 33 and 41 will supply a "1" signal and when the transistors T1 and T2 are conducting, the junctions 33 and 41 will supply a "0" signal. It is to be appreciated that a slight forward emitter to base bias voltage is required to switch the transistors from a nonconducting to a conducting state, so that during each full cycle of the voltage wave supplying the emitter to base current of the transistors T1 and T2, the transistors will be nonconducting for a slightly longer period than they are conducting. However, because only a slight difference exists between the nonconducting periods and the conducting periods of the transistors T1 and T2 during each full cycle, the duration of the "1" and "0" signals at the junctions 33 and 41 will be practically identical with the "1" having a slightly longer duration, e.g., 2 to 4 degrees, which is insufficient to impair the operation of the resistance welder.

As shown in FIG. 1, during normal or standby conditions, the initiating switch SW1 is open so that the junction A has a "1" signal impressed thereon as shown by curve A in FIG. 4. The "1" signal at A causes the Nor N2 to provide a "0" output signal as shown by the curve N2 which is impressed on the junction B. Also the "1" signal at the junction A through the diode D6, which is part of the And circuit that includes the diode D5, causes the counter 52 to remain in a reset condition. The remaining Nors N3–12 are in the condition shown by the respective curves N3–12 to the left of the point designated as SW1 closed.

The standby condition of the logic circuit ceases upon closure of the initiating switch SW1 which connects the junction A directly to the ground G so the signal at the junction A changes from "1" to "0." While the closure of the initiating switch SW1 may be instituted at random, that is, at any instant during either the L1 or L2 half cycles of the supply source 23 without affecting the operating of the welding current, it will be seen by the curve A that the closure of the initiating switch SW1 is illustrated as occurring late in an L1 half cycle, as shown by curve 4A. The change in the signal to "0" at the junction A when the initiating switch SW1 is closed removes an input signal to one of the inputs of the Nor N2 which also receives an input from the transistor T1. It will be seen by the curve T1 that during the L2 half cycle the transistor T1 supplies a "1" signal and a "0" signal during each L1 half cycle. Thus the Nor N2 will switch only during an L1 half cycle when the initiating switch SW1 is closed as is shown by curve N2.

The Nors N3 and N4 are connected as a Nor memory and have been previously reset, as will be hereinafter explained, so that the Nor N3 supplies a "1" signal during standby conditions and the Nor N4 supplies a "0" signal. When the output signal of the Nor N2 switches to a "1," the Nor N3 switches to provide a "0" output signal as shown by curve N3. The output "0" signal of the Nor N3 permits the Nor N4 to switch to have a "1" output signal as both its inputs from Nor N3 and Nor N10 are "0," as will be later explained. The "1" output signal of the Nor N4 is transmitted as an input to the Nor N3 to switch the Nor memory and the Nor N3 continues to supply a "0" output signal during the interval when the transistor T1 causes the output signal of the Nor N2 to alternate without effect between "0" and "1," as shown in curve N2.

The "0" output signal of the Nor N3 is transmitted through the junction 45 and the diode D5 to the reset terminal 56 of the counter 52. As the diode D5 and the diode D6 are connected as an And circuit and the diode D6 now supplies the "0" signal from the junction A, the reset signal to the counter 52 is removed and the counter 52 is in condition to count as will be later set forth.

The change to an output "1" signal of the Nor N4 is transmitted through the junction 46 and the diode D3 as an input to the Nor N5. The diodes D3 and D4 are connected as an And circuit to the same input of the Nor N5 so that both diodes must supply a "1" signal to the Nor N5 before the Nor N5 switches. The Nor N5 is connected with the Nor N6 so the Nors N5 and N6 act as a Nor memory, which was previously reset, so the Nor N5 supplies a "1" output signal and the Nor N6 supplies a "0" output signal. The diode D4 receives its signals from the transistor T1 which supplies "1" signals only during a L2 polarity half cycle. Thus while the Nors N2, N3 and N4 were switched during a L1 half cycle, in response to a random closure of the initiating switch SW1 causing the Nor N4 to supply a "1" signal, the Nor N5 will switch only at the beginning of an L2 half cycle when the transistor T1 supplies an appropriate "1" signal through the diode D4. The switching of the Nor N5, which is shown by curve N5, causes the Nor N6 to switch, as shown by the curve N6, so that the Nor N6 supplies a continuous "1" output signal to the Nor N5 to maintain the Nor memory consisting of the Nors N5 and N6 in the condition as shown by curves N5 and N6. Thus after the Nors N5 and N6 are switched so the Nor N6 supplies a "1" signal, the changing of the input signal from the transistor T1 through the diode D4 to the Nor N5 will be ineffective to change the state of the Nor memory.

The output of the Nor N5 is connected through the junction 48 to the inputs of the Nors N7, N8 and N9. The Nor N7 receives an additional input from the transistor T1 through the junctions 44, 50 and 49 and the Nor N9 receives an additional input from the transistor T1 through junctions 44, 50 and 49. As was previously explained, the Nor N5 switched to provide a "0" output signal at the beginning of an L2 half cycle in response to the switching of the transistor T1. Thus the same signal which caused the switching of the Nor N5 prevents the switching of the Nors N7 and N9 during the L2 half cycle which follows the switching of the Nor N5. The Nor N7, as shown by curve N7, at the end of the L2 half cycle during which the Nor N5 switched, also switches to provide a "1" output signal as an input to the counter 52. The output signal from the Nor N7 is controlled by the output signal of the transistor T1 which is synchronized with the voltage wave of the source, so that after initially switching, the Nor N7 provides a series of "1" and "0" signals at the transition from a L1 to a L2 half cycle of the supply 23.

The counter 52, preferably of the type fully disclosed in the Meyer patent supra, will count only when its input changes from "1" to "0." This signal change occurs only at the end of an L1 half cycle, as shown by curve N7.

As was previously set forth, the Nors N8 and N9 along with the Nor N7 each received input signals from the Nor N5. The Nor N8 and the Nor N9 however each receive an additional input from the transistor T2 of the heat control circuit. The Nor N8 receives its input directly from the junction 41 through the junction 51 while Nor N9 receives its input from the junction 41 through the junction 51 and the Nor N1. The Nor N1 inverts the signal from the transistor T2, as shown by the curve N1. Thus at the end of the L2 half cycle when the Nor N7 switches, it will be seen from curve T2 that the Nor N8 receives a "1" signal from the transistor T2 so that the switching of the Nor N8 is delayed for an adjustable interval as determined by the adjustment of the resistor R5. Therefore sometime during the half cycle following the switching of the Nor N7, the Nor N8 switches to have a "0" output signal.

It will be seen from the foregoing that while the switching of the Nor N8 was basically controlled by the switching of the Nors N5 and N6, which as a Nor memory had their switching controlled by the transistor T1 of the synchronizing circuit, that once the Nor memory switches it was no longer repsonsive to the changing signal of transistor T1. Thus subsequent to the initial switching of the Nor N8, by the Nor memory, the switching of the Nor N8 is controlled by the transistor T2 so the Nor N8 supplies a series of alternate "1" and "0" signals at instants of switching synchronized with the switching of the transistor T2 with the Nor N8 switching to provide a "1" signal at an adjustable instant during an L2 half cycle and a "0" signal 180° later during an L1 half cycle.

The signal from the transistor T2 which permitted the Nor N8 to switch is inverted by the Nor N1 and thus prevents the Nor N9 from switching. Thus 180° after the Nor N8 switches to provide a "1" signal, the Nor N9 switches to provide a "1" signal as shown by curve N9. The synchronizing circuit through the transistor T1 also continuously controls the switching of the Nor N9. Therefore as shown by the curve N9, a short interval after the Nor N9 switches to provide a "1" output signal, the transistor T1 supplies a "1" input signal to cause the Nor N9 to again supply a "0" signal.

The output signals of the Nors N8 and N9 are directly supplied as inputs to the Nors N11 and N12 which act as amplifiers and invert the signals from the Nors N8 and N9 and supply signals as shown by curves N11 and N12 to the firing circuits 65 and 66. It will be seen from the curves N11 and N12 that the signal output of the Nor 12 changes from "1" to "0" during an L2 half cycle and the signal from the Nor N11 changes from a "1" to "0" during a subsequent L1 half cycle. Also, as shown by curve N7, the counter 52 is stepped at the end of each L1 half cycle. Therefore if the firing circuits 66 and 65, which per se do not constitute one of the features of the present invention, are arranged to provide an output firing pulse to the igniters 72*i* and 69*i* each time an input signal to the firing circuits 66 and 65 changes from "1" to "0," full cycle welding current flow to the welding electrodes 77 will be assured. That is, if the anode 72*a* is connected to the L2 terminal so it has a positive polarity during the L2 half cycle and the anode 69*a* is connected to the L1 terminal to have a positive polarity during the L1 half cycle, then as firing circuit 66 is the first to provide a firing pulse during each weld sequence during an L2 half cycle, welding current will flow through the welding transformer primary 74 for a portion of a L2 half cycle determined by the signal from the transistor T2 of the heat control network. During the subsequent L1 half cycle the firing circuit 65 supplies a firing pulse to the igniter 69*i* of ignitron 69, during that portion of the L1 half cycle when anode 69*a* is positive. This igniting pulse will cause the ignitron 69 to conduct and pass welding current though the welding transformer primary 74. As each weld sequence always is terminated at the end of an L1 half cycle and initiated during an L2 half cycle, full cycle flow of welding current is assured.

As previously explained, the counter 52 receives a series of input pulses from the Nor N7 as is shown by curve N7. While counters of the type herein contemplated are well known, the counter as disclosed in the Meyers patent supra is an example of a counter particularly suited for use in the circuit shown in FIG. 1. The counter 52 is arranged to be stepped or be switched whenever the input changes from "1" to "0." The outputs of the counter 52 are connected through a plurality of leads indicated by 52*a*, 52*b*, and 52*c* through a plurality of decimal calibrated selector switches, not shown, and contained within the diagrammatic block 53. The selector switches, indicated by block 53, are connected through suitable logic circuits, not shown, to a common lead and the diode D7 to the input of the Nor N10. The selector switches 53 may be adjusted so at the end of the desired count the output of Nor N10 will switch. As shown by curve N7, the selector switch 53 is adjusted for a count of 5. Prior to the achievement of the count 5, the counter 52 will supply a "1" signal through at least one of the leads 52*a*, 52*b* or 52*c* and the switches 53 as an input to the Nor N10 and thus the Nor N10 will have a "0" output signal, as shown by curve N10. When five "1" to "0" input signal changes have been supplied to the counter 52 by the Nor N7, all of the leads 52*a*, *b* and *c* will simultaneously supply a "0" signal through the switches 53 to the Nor N10 so the output signal of the Nor N10 switches to "1" as shown by curve N10. This signal change which occurs at the end of an L1 half cycle is fed as an input signal through the junction 55 to the Nors N4 and N6.

If the initiating switch SW1 was opened prior to the count selected by switches 53, then the Nor N2 will recenve a "1" input signal from the junction A and the Nor N2 will supply a continuous "0" signal to the Nor N3 so the Nor memory, consisting of the Nors N3 and N4, is in a condition to be reset by the signal from Nor N10. It will be noted that the "1" signal from the junction A also is transmitted as an input to the diode D6. However, the "1" signal input to the diode D6 will be ineffective to reset the counter 52 through the junction 56 because the Nor memory consisting of the Nors N3 and N4, prior to receiving the full count signal from the Nor N10, was previously switched so the Nor N3 supplies a "0" signal through the diode D5 to the junction 56. As the diodes D5 and D6 are connected as an And circuit, the change to a "1" signal at the diode D6, because of an opening of the initiating switch SW1 during the weld sequence, will be ineffective to reset the counter 52. Thus the circuit is provided with a non-beat feature.

If, as stated above, the initiating switch SW1 is opened prior to the end of the desired count, the "1" signal input from Nor N10 to the Nor N4 causes the Nor memory to switch so the Nor N3 supplies a "1" output signal and the Nor N4 supplies a "0" output signal. The "0" signal from the Nor N4 is transmitted through an And circuit which includes the diodes D3 and D4 to the Nor N5. This removes the "1" input from junction 47 and thus conditions the Nor memory N5–N6 for switchin response to the reset signal received from Nor N10. The Nors N5 and N6 thus switch at the end of the count to the condition shown by curves N5 and N6 wherein Nor N5 supplies a "1" signal to the Nors N7, N8 and N9. The "1" input signal to the Nor N7 halts the counting pulses to the counter 52 as the output of the Nor N7 becomes a continuous "0." The "1" input signals to the Nors N8 and N9 causes their output signals to become a continuous "0" which through the Nors N12 and N11 halts the delivery of the firing pulses by the firing circuits 66 and 65, and thereby the conduction of the ignitrons 72 and 69 so welding current flow to transformer primary winding 74 ceases.

Also, the change to an output signal of "1" from the Nor N3, when the Nor memory N3–N4 switches in response to the "1" signal from the Nor N10, is transmitted through the diode D5 to the junction 56 which, when the initiating switch SW1 is open, also receives a "1" from diode D6. Thus as each branch of the And circuit consisting of the diodes D5 and D6 supplies a "1" signal, the counter 52 is reset. When the counter 52 is reset the input signal to the Nor N10 changes to "1" so that the Nor N10 supplies a "0" signal to the Nor memories N3–N4 and N5–N6. This change in signal from the Nor N10 is without effect as the Nor memories were previously switched in response to the "1" signal from Nor N10 when the desired count was achieved by the counter 52.

If at the end of a weld sequence, as determined by the counter 52, the initiating switch SW1 is still closed, a "0" signal input to the Nor N2 will be present at the terminal A. This "0" signal will be delivered to the diode D6 of the And circuit and will prevent resetting of the counter 52 so the Nor N10 will continue to supply a "1" signal to reset the Nor memories N3–N4 and N5–N6. The Nors N4 and N6 thus will provide a continuous "0" signal. The output of the Nor N4 is connected through an And circuit including the diodes D3 and D4 to supply an input to the Nor N5. Thus the Nor N5 will remain in a reset condition even though the Nors N2 and N3 are switched in response to the signal from the transistor T1. When the Nor N5 is reset it supplies a "1" signal to the Nors N7, N8 and N9 to halt the counting of the counter 52 and the flow of the welding current as previously described. The counter 52 is reset and the system is returned to standby only upon release or opening of the initiating switch SW1 so the circuitry thus provides a non-repeat operation of the welding apparatus.

As shown in FIG. 1, the Nor N8 has an input connected through the lead 57 and the junction 58 to the contact 59 of the switch SW2 and the Nor N9 has an input connected through the lead 60 and the junction 61 to the contact 62 of the switch SW2. The pulse alternator 78 which has an input 81 connected through the normally open switch SW4 and the junction 82 to the output of Nor N5, has a pair of output terminals 79 and 80 connected through the normally open contacts of a switch SW3 to the junctions 58 and 61.

Normally the switches SW2, SW3 and SW4 are in the open position as shown, so that the leads 57 and 60 are de-energized and the operation of the Nors N8 and N9 proceeds as previously described. If individual welds of one half cycle weld current duration are desired, the circuitry shown may be adjusted to provide the desired results. The counter 52 is first set to the count of one. That is, as previously described, after a full L2 and subsequent L1 half cycle, the counter will cause the Nor N10 to supply a "1" signal to terminate welding current flow. Thus the counter 52 is set to count one full cycle. The switches indicated by numeral 53 also are arranged when set to provde a count of one to close the switch SW4 for the reason to be hereinafter explained.

When the switch SW3 is open and the switch SW2 positioned so that the contact 59 is connected to the terminal 64, the lead 57 will receive a continuous "1" signal and the Nor N8 will be prevented from switching in response to the signals from the transistor T2 after the Nor memory N5–N6 is switched to initiate welding current flow. The Nor N9 however is not so prevented and the Nor N9, under the control of the transistor T2, causes the Nor N11 and the firing circuit 65 to operate to cause conduction of the ignitron 69 during one L1 half cycle after which the counter 52 causes the circuitry to block the switching of the Nor N9 by the transistor T2. Thus a L1 half cycle weld current flow having a duration during the half cycle as determined by the heat control circuitry is delivery to the welding transformer 73.

When the switch SW3 is open and the switch SW2 positioned so the contact 62 is connected to the terminal 64, the lead 60 will receive a continuous "1" signal and the Nor N9 will be prevented from switching in response to the signals from the transistor T2 after the Nor memory N5–N6 is switched to initiate welding current flow. The Nor N8 however is not so prevented and the Nor N8, under control of the transistor T2, causes the Nor N12 and the firing circuit 66 to operate and cause conduction of the ignitron 72 during one L12 half cycle after which, at the conclusion of the subsequent L1 half cycle, the counter 52 causes the circuitry to block the switching of the Nor N8 by the transistor T2. Thus an L2 half cycle weld current flow having a duration during the half cycle as determined by the heat control circuitry is delivered to the welding transformer 73.

Thus the apparatus may be adjusted to provide one half cycle of welding current flow during either a selected L1 or a L2 half cycle. This type of welding current flow may be desirable when welding fragile, small-mass parts of minimum thickness. However, it will be seen that unless the switch SW2 is adjusted after each weld is formed, if a succession of welds are made, the transformer will be successively supplied with pulses of half cycle alternating current, each of which are identical in polarity. These pulses of current would have the effect of direct current pulses on the magnet iron core of the transformer and cause the iron to become magnetically saturated and correspondingly reduce the impedance of the transformer to a point where a damaging current would flow through the conducting ignitrons.

The advantages of half cycle welds may be retained without saturating the iron core of the welding transformer if the pulse alternator 78 is included in the circuit. The pulse alternator 78 is properly included in the circuitry when the switches SW3 and SW4 are closed to connect the output terminals 79 and 80 to the junctions 58 and 61 and the switch SW2 is adjusted so neither of the contacts 59 or 62 are connected through the terminal 64 to the negative 20 volt DC source.

The type of pulse alternator 52 for use in the above circuit, which is disclosed in the Meyer application supra, may be described as a single stage counter that utilizes a resistor capacitor coupled saturated flip flop and diode steering. The pulse alternator 78, as described, will supply opposite signals of "1" and "0" at the terminals 79 and 80 and change the signals each time it receives a "1" to "0" signal change from Nor N5. Thus if the initiating switch SW1 is closed and the terminal 79 is supplying a "1" signal and the terminal 80 a "0" signal with the switches 53 of the counter 52 adjusted for a one cycle weld, weld current will flow during a L1 half cycle in the same manner as described when the switch SW2 was positioned to complete a circuit to contact 59. During the next weld sequence when the signal output of Nor N5 changes from "1" to "0," the pulse alternator 78 will switch so terminal 79 supplies a "0" signal and the terminal 80 a "1" signal. Thus during the next weld the signals at terminals 79 and 80 will cause weld current to flow during a L2 half cycle in the same manner as described when the switch SW2 was positioned to complete a circuit to contact 62.

Thus when the pulse alternator 78 is included in the circuit to receive an input from the Nor N5 and the presetting switches 53 are adjusted to provide welds of one cycle duration, a series of half cycle welds will be formed without saturating the welding current transformer 73 with rectified direct current from the alternating current source. It will be seen that as the Nor N5 is connected with Nor N6 as a Nor memory so that it provides an output as shown on curve N5, jittering of the initiating switch SW1 will be without effect on the formation of half cycle welds.

In conventional logic circuits a special signal is usually provided to the Nor memories and the counters to assure that the Nor memories are properly switched and the counter is properly reset when power is initially applied to the system. This provision is included because the various components as used in the Nor memories and the Nor memories within the counters may have different electrical characteristics. Thus as a Nor memory is stable in either of two conditions or states, when power is first applied to a Nor memory, the transistors, in the absence of a suitable signal, engage in a figurative race with each other to determine which of the two states the Nor memory will assume. The arrangement which will be hereinafter described provides an inexpensive solution to achieve proper reset switching of the Nor memories without an external signal being applied to the circuitry.

As was described in connection with FIG. 1, the Nors N3 and N4 are connected as a Nor memory N3–N4 and the Nor N10 normally receives a '1" signal input from the counter 52. This will cause the Nor N10 to supply a "0" signal to the Nor N4. When the Nor memory N3–N4 is reset at the end of each count, the Nor N10 supplies a "1" signal to the Nor N4 and the Nor memory N3–N4 switches so the Nor N3 outputs is "1" and the Nor N4 output is "0."

Further it can be seen in FIG. 1, that the output of the Nor N10 is also connected as a reset input to the Nor memory N5–N6 which controls the flow of welding current so it is important that the Nors N5–N6 be properly switched when power is initially applied to the logic system to avoid misfiring of the welder ignitrons 69 and 72 during standby conditions.

During standby conditions, the signal at junction B is "0" and therefore will have no effect on the switching of the transistor TN3 in FIG. 3. When the switch 88 is initially closed to provide energy to the logic system through the transformer 85 to charge capacitors C2 and C3, the potential of lead 96 does not instantaneously rise to the −20 volts but rather it increases over a time interval required to charge the capacitor C3. If we assume that the transistors TN3 and TN4 do not have their inputs connected to either the junction B or junction 55 it will be apparent that the Nor memory TN3–TN4 will assume either of two unpredictable states. Thus if the transistor TN3 is the first to saturate, the transistor TN4 will be biased against conduction and the transistor TN4 will provide a "1" signal at the junction 46 which will effectively lock the transistor TN3 in its conductive state wherein its provides a "0" output signal.

When the transistor TN10 and the diode D7 are included in the circuit, the switching of the transistors TN3 and TN4 as described in the preceding paragraph is prevented.

When the switch 88 is open, as shown in FIG. 3, the transistors TN3, TN4 and TN10 are nonconductive. When the switch 88 is closed, the source 23 through transformer 85 and diodes D10 and D11, charges capacitor C3 to apply a voltage potential across the transistors TN10–TN3 and TN4 between the ground G and the lead 96. The voltage applied does not instantly cause the capacitor C3 to change from zero volts to a full potential but requires a short time interval before the voltage between the ground G and the lead 96 equals the terminal potential of the secondary winding 87.

It is well known that diodes present a low impedance to current flow when connected in one direction and a high impedance to current flow when they are connected in an opposite direction in a circuit. However, regardless of the direction of their connection, a diode will provide impedance to current flow. Good engineering practice dictates that usually the diodes are selected to have the characteristic to provide a minimum impedance in a circuit. In contrast, the diode D7 is chosen to provide a relatively high impedance when conducting current in a low impedance direction. That is, if we assume the capacitor C3 will be ultimately charged to be capable of providing 20 volts and the diode D7 is selected to provide an impedance which will require more than 5 volts be impressed across its terminals before it will conduct current in the direction of its lowest impedance then a time interval will elapse before diode D7 will conduct current. Thus as switch 88 is initially closed, before the voltage between the ground G and the lead 96 increases to 5 volts, base current flow in the transistor TN10 is blocked by the diode D7 and the potential at the junction 55 will follow the potential of the lead 96. This will in effect cause the junction 55 to furnish a reduced voltage "1" signal which will be sufficient to aid the transistor TN4 to switch to its conductive state while the transistor TN3 will be unaided as the circuit which provides the signal to the terminal B is not provided with any special provision for preventing the signal at B from becoming "0." The blocking effect provided by the diode D7 during the time interval before the potential between the ground G and the lead 96 exceeds a predetermined potential, depending upon the selected characteristics of conduction of diode D7, will cause the transistor TN4 to switch to its conductive state and thereby supply a signal which follows the voltage rise of the lead 96 to bias the transistor TN3 against conduction. Thus the Nor memory TN3–TN4 is supplied with a reset signal during the initial application of power to the logic system. It can be seen that the foregoing explanation equally applies to the application of a reset signal to Nor N6 which is connected with Nor N5 as a Nor memory.

As seen in FIG. 1, after the potential between ground G and the lead 96 has risen to exceed the blocking effect of diode D7, the Nor N10 will switch and the signal at junction 55 will become "0" because of the "1" input signal from the counter 52 through the switches 53 and the diode D7. The change of the signal at junction 55 from a low potential "1" to "0" will be without effect as the Nor memories, e.g., N3–N4 and N5–N6, will have been previously switched by the low potential "1" reset signal from the Nor N10. The Nor N5, which is switched by the low potential "1" signal to the Nor N6 provides a "1" signal to Nors N7, N8 and N9 which prevents firing of the ignitrons 69 and 72 and input signals to the counter 52 during standby conditions.

What is claimed is:

1. A synchronizing circuit for a resistance welder control, comprising: a transformer having a primary winding energized by an alternating current source and a secondary winding having a pair of output terminals, a transistor having an emitter electrode, a base electrode, and a collector electrode, a semiconductor diode having a pair of electrodes, the diode and the transistor having substantially equal and minimal impedances when the diode is conducting current in a forward direction between its electrodes and the transistor is conducting current in a forward direction between its emitter and its base electrodes, means connecting the electrodes of the diode in a parallel circuit with the base and emitter electrodes of the transistor between the output terminals with the electrodes of the diode and transistor poled so the transistor provides a low impedance path to an alternating current flowing in one direction between the output terminals when the transistor is conducting in a forward direction and the diode provides a low impedance path to alternating current flow between the terminals in a direction opposite the said one direction when the diode is conducting in a forward direction, a direct current source, circuit means including a third terminal connecting the emitter and the collector electrodes across the direct current source to supply an output signal change at the third terminal in response to a change in direction of current flow between the pair of terminals of the secondary winding, means including an initiating switch, the direct current source and a fourth terminal for supplying a signal change at the fourth terminal upon operation of the initiating switch, and a Nor circuit having a pair of input terminals respectively connected to the third and the fourth terminals and an output terminal providing an output signal change when the signal change at the third terminal corresponds to the changed signal at the fourth terminal.

2. The synchronizing circuit as recited in claim 1 including a first Nor memory, having an input terminal connected to the output terminal of the Nor circuit and an output terminal providing an output signal change in response to the output signal change of the Nor circuit.

3. The circuit as recited in claim 2 including an AND logic circuit and a second Nor memory, said second Nor memory having an input connected through the AND logic circuit respectively to receive the output signal changes from the Nor circuit and the third terminal.

4. The circuit as recited in claim 1 including a second transistor having an emitter electrode, a base electrode and a collector electrode, a second semiconductor diode having a pair of electrodes, the second diode and the second transistor having substantially equal and minimal impedances when the second diode is conducting current in a forward direction between its electrodes and the second transistor is conducting current in a forward direction between its emitter and its base electrodes, means including a second pair of terminals connecting the electrodes of the diode in a parallel circuit with the base and emitter electrodes of the second transistor between the second pair of output terminals with the electrodes of the diode and the base and the emitter electrodes of the second transistor poled so the transistor provides a low impedance path to current flowing in one direction between the second pair of output terminals and the diode provides a low impedance path to current flowing between the second output terminals in a direction opposite the said one direction, and means for causing an alternating current to flow between the second pair of output terminals that is out of phase with the alternating current flowing between the first pair of output terminals.

5. The circuit as recited in claim 3 including a second transistor having an emitter electrode, a base electrode and a collector electrode, a second semiconductor diode having a pair of electrodes, the second diode and the second transistor having substantially equal an minimal impedances when the second diode is conducting current in a forward direction between its electrodes and the second transistor is conducting current in a forward direction between its emitter and its base electrodes, means including a second pair of terminals connecting the electrodes of the diode in a parallel circuit with the base and emitter electrodes of the second transistor between the second pair of output terminals with the electrodes of the diode and the base and the emitter electrodes of the second transistor poled so the transistor provides a low impedance path to current flowing in one direction between the second pair of output terminals and the diode provides a low impedance path to current flowing between the second output terminals in a direction opposite the said one direction, and means for causing an alternating current to flow between the second pair of output terminals that is out of phase with the atlernating current flowing between the first pair of output terminals.

References Cited

UNITED STATES PATENTS

| | | | |
|---|---|---|---|
| 2,863,066 | 12/1958 | De Witt et al. | 307—261 |
| 2,897,378 | 7/1959 | Jones | 307—261 |
| 2,898,479 | 8/1959 | McElroy | 307—282 |
| 3,027,524 | 3/1962 | May | 307—259 XR |
| 3,131,315 | 4/1964 | Morwald | 307—282 XR |
| 3,197,649 | 7/1965 | Jukes | 307—282 XR |
| 3,248,640 | 4/1966 | Wellford | 307—282 XR |

JOHN S. HEYMAN, *Primary Examiner.*

STANLEY T. KRAWCZEWICZ, *Assistant Examiner.*

U.S. Cl. X.R.

307—215, 243, 262, 282; 328—33